Figure 1:
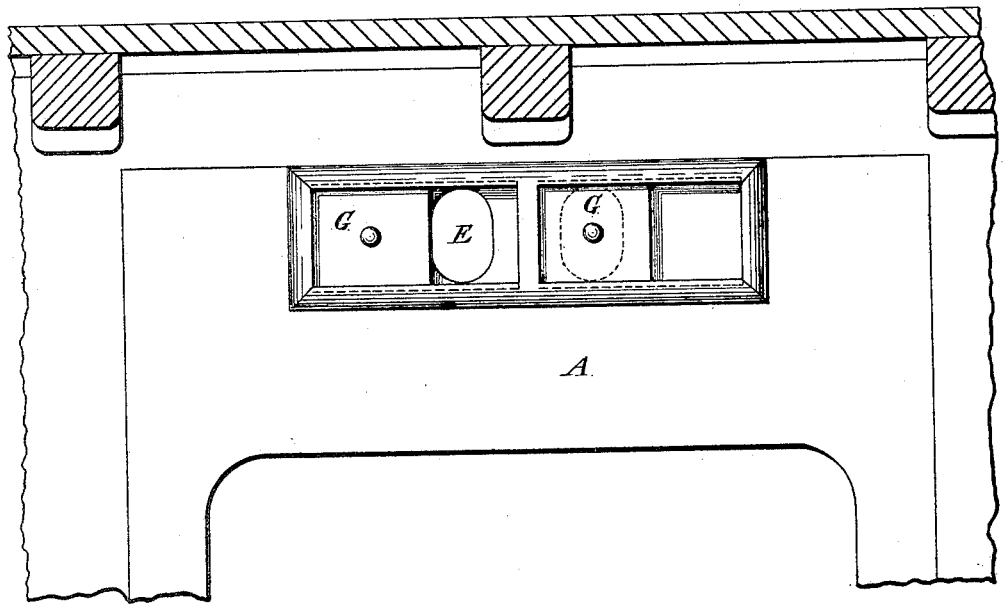

(No Model.) 4 Sheets—Sheet 1.

J. ANDERSON.
APPARATUS FOR VENTILATING RAILWAY OR OTHER CARRIAGES.

No. 454,392. Patented June 16, 1891.

(No Model.) 4 Sheets—Sheet 2.
J. ANDERSON.
APPARATUS FOR VENTILATING RAILWAY OR OTHER CARRIAGES.
No. 454,392. Patented June 16, 1891.
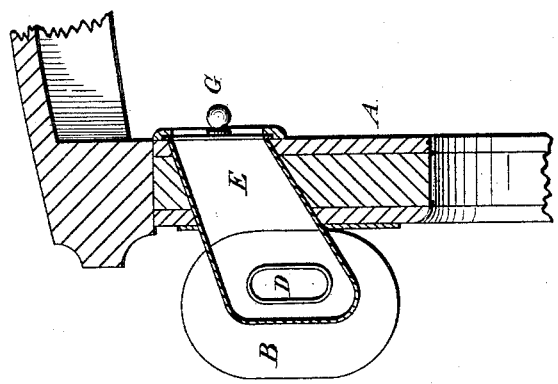
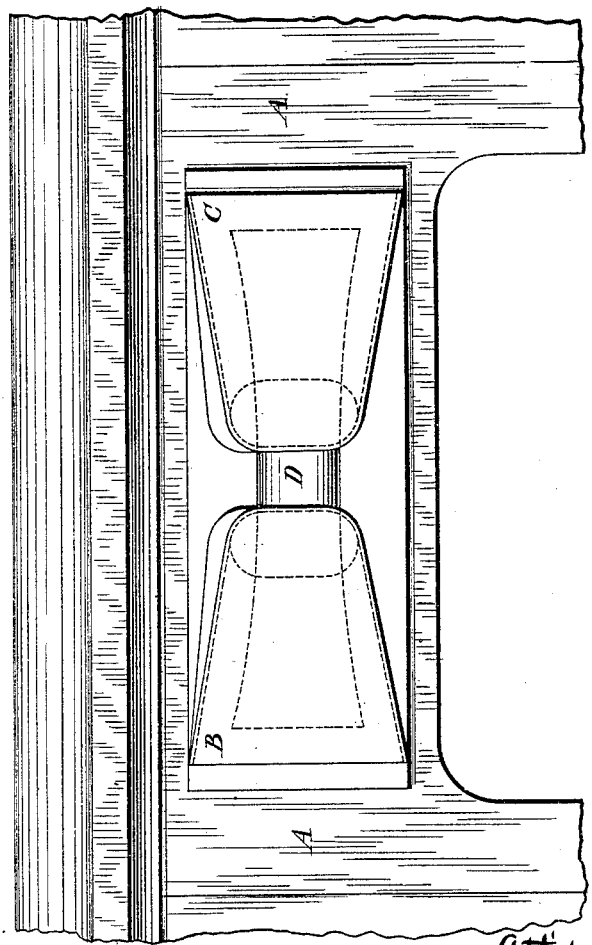

(No Model.) 4 Sheets—Sheet 3.
J. ANDERSON.
APPARATUS FOR VENTILATING RAILWAY OR OTHER CARRIAGES.
No. 454,392. Patented June 16, 1891.
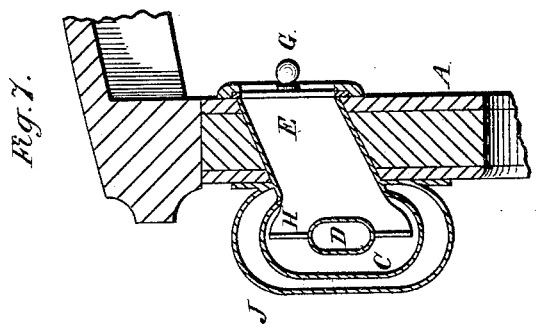
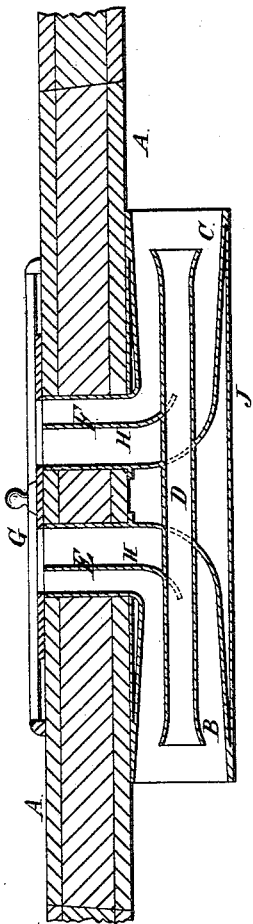
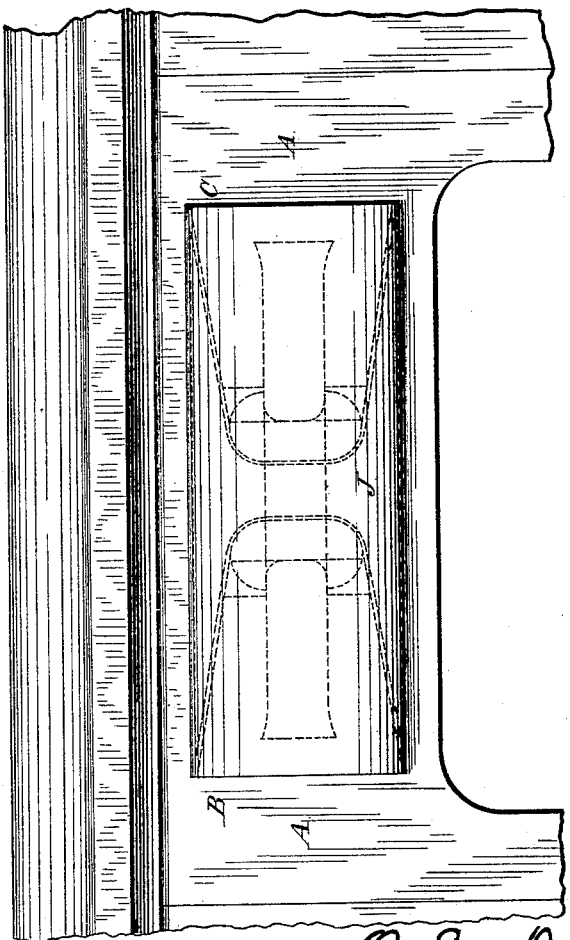

(No Model.) 4 Sheets—Sheet 4.

J. ANDERSON.
APPARATUS FOR VENTILATING RAILWAY OR OTHER CARRIAGES.

No. 454,392. Patented June 16, 1891.

UNITED STATES PATENT OFFICE.

JOHN ANDERSON, OF OBAN, COUNTY OF ARGYLE, SCOTLAND.

APPARATUS FOR VENTILATING RAILWAY AND OTHER CARRIAGES.

SPECIFICATION forming part of Letters Patent No. 454,392, dated June 16, 1891.

Application filed September 3, 1888. Serial No. 284,498. (No model.) Patented in England October 18, 1887, No. 14,091; in France August 8, 1888, No. 192,304; in Belgium August 9, 1888, No. 82,841; in Germany August 14, 1888, No. 47,420; in Italy September 30, 1888, XLVII, 222; in Victoria September 28, 1888, No. 6,219; in New South Wales October 1, 1888, No. 975; in South Australia October 2, 1888, No. 1,131; in Austria-Hungary February 16, 1889, No. 34,156; in India March 11, 1889, No. 63, and in Spain March 8, 1890, No. 10,333.

*To all whom it may concern:*

Be it known that I, JOHN ANDERSON, a subject of the Queen of Great Britain and Ireland, residing at Burnbank House, Oban, in the county of Argyle, Kingdom of Great Britain and Ireland, have invented Improvements in Apparatus for Ventilating Railway and other Carriages, (for which I have obtained Letters Patent in the following countries: Great Britain, dated October 18, 1887, No. 14,091; Austria-Hungary, dated February 16, 1889, No. 34,156; Victoria, dated September 28, 1888, No. 6,219; New South Wales, dated October 1, 1888, No. 975; South Australia, dated October 2, 1888, No. 1,131; India, dated March 11, 1889, No. 63 of 1888; Spain, dated March 8, 1890, No. 10,333; France, dated August 8, 1888, No. 192,304; Belgium, dated August 9, 1888, No. 82,841; Germany, dated August 14, 1888, No. 47,420, and in Italy, Vol. 47, dated September 30, 1888, No. 222,) of which the following is a specification.

My invention has for its object the ventilating of railway and other carriages in an improved manner, my improved arrangements while being effective and controllable being also such as to avoid objectionable drafts.

In carrying out my invention in the case of a railway-carriage the improved apparatus may be fitted to various parts of the carriage; but it is by preference placed in the upper parts of the doors, where ordinary ventilators are usually placed.

In some modifications my improved apparatus as made for each door comprises two air-passages communicating between the interior and exterior of the carriage, and the external parts of these passages are formed with funnel-mouths facing opposite ways, so that one faces forward and the other backward, in whichever direction the carriage may be moving, the motion of the carriage causing the air to enter one passage and to tend to pass out through the other passage. With the view of increasing the exhaust action or movement of the outgoing current of air a third passage is combined with the other two, and is formed by an inner tube extending through from one funnel-mouth to the other and placed concentrically, or nearly so, with the funnel-mouths, but with sufficient space round it for the communications of the mouths with the passages leading into the carriage. With this construction part of the air, entering whichever funnel-mouth is facing forward, passes through the inner tube, and, issuing from its back end, acts inductively on the air passing outward and increases its velocity. In other modifications the third passage or the "inductive passage," as it may be termed, is formed by means of an outer jacket or shell, so as to more or less surround the external parts of the other two passages. At the parts of the air-passages opening into the interior of the carriage any suitable known arrangement of ports or valves may be applied, but preferably such as will direct the entering air horizontally across the carriage or with more or less of an upward or upwardly-inclined direction, so that the entering air may become distributed near the roof of the carriage and above the heads of passengers in order to avoid drafts.

In order that my said invention and the manner of performing the same may be properly understood, I hereunto append two sheets of explanatory drawings to be hereinafter referred to and representing examples of the various modes in which my invention may be applied in practice.

Figure 2:
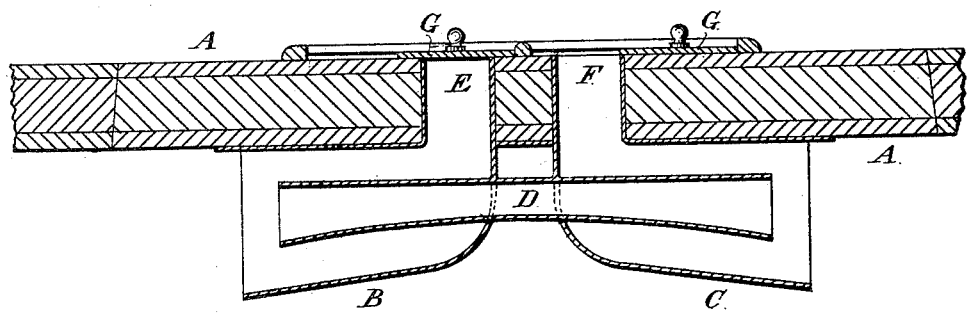
Figure 10:
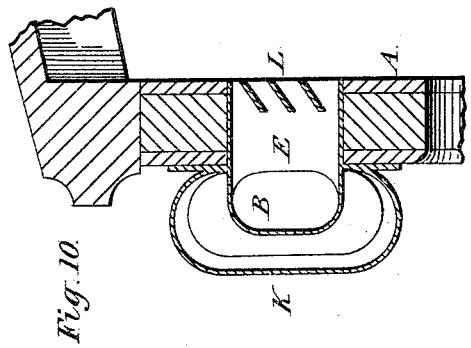
Figure 11:
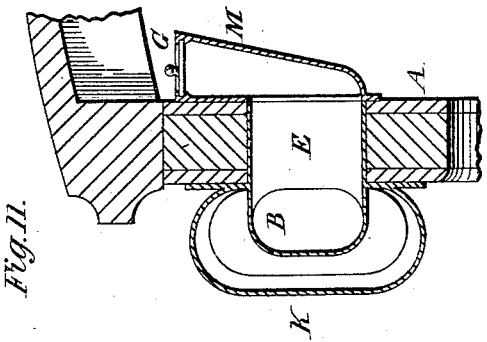
Figure 8:
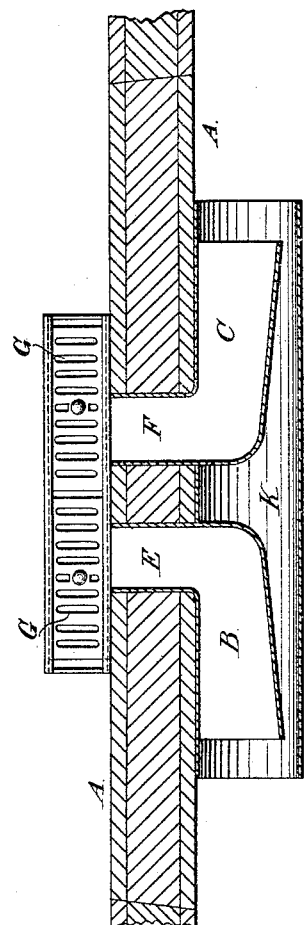
Figure 9:
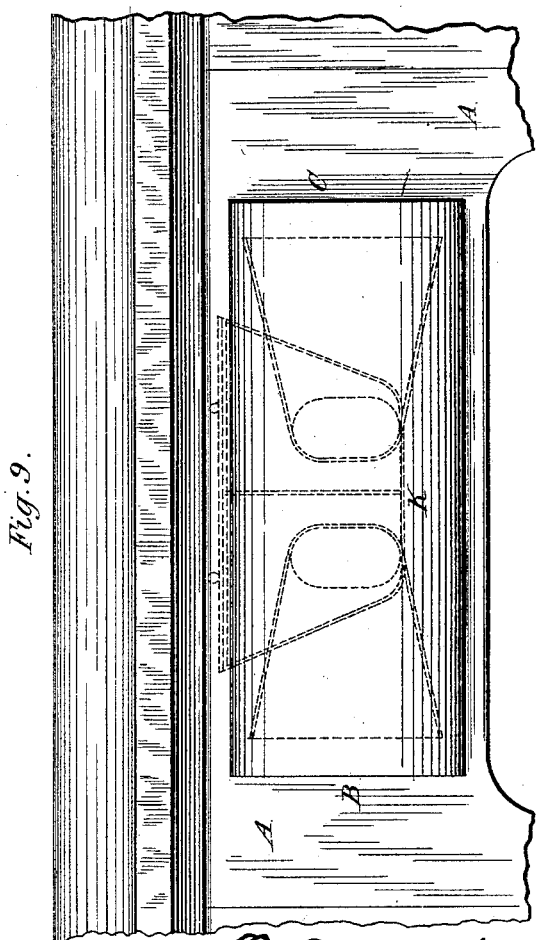

Figure 1 of the drawings is a sectional internal elevation, Fig. 2 is a horizontal section, Fig. 3 is an external elevation, and Fig. 4 is a transverse vertical section, of one modification of my improved ventilating apparatus. Fig. 5 is a horizontal section, Fig. 6 is an external elevation, and Fig. 7 is a transverse vertical section, of a second modification. Figs. 8 and 9 are respectively a horizontal section and an external elevation of a third modification. Figs. 10 and 11 are transverse vertical sections of modifications of the parts of the inner ends of the air-passages.

In the drawings the same reference-letters are used to mark the same or like parts wherever they are repeated.

In the modification shown in Figs. 1 to 4 there are fixed on the outside of the upper part of the carriage-door A two shells of metal or other suitable material shaped to form air-passages B C and made with enlarged funnel-shaped mouths at their outer ends and having their inner ends directed inward into the carriage. The mouths or outer ends of the two air-passages B C face in opposite directions, so that when the carriage is moving the air enters one passage and tends to go out through the other. A third passage D, hereinbefore termed an "inductive passage," is combined with the two air-passages B C, being formed by a tube extending longitudinally from one mouth to the other in a straight line, or nearly so, with its ends, which are somewhat funnel-shaped or otherwise conveniently shaped at or near the outer ends of the air-passages B C and with these passages surrounding it completely, excepting where they turn inward to the interior of the carriage. When the carriage is in motion, air passes through this inductive passage or tube D, and at its rear end acts so as to increase the velocity of the air going out through what is for the time the rear air-passage B or C. At the inner ends E F of the air-passages B C two simple slides G are shown as fitted for closing or more or less opening either air-passage. As hereinbefore mentioned, any suitable known construction of the inner ends E F of the air-passages B C, or of valves—such as G, or others—may be used, and I make no claim to any peculiarity of such parts considered separately.

The modification shown in Figs. 5, 6, and 7 is very similar to that shown in Figs 1 to 4, and hereinbefore described. The induction-tube D is made of uniform cross-section, excepting at the ends, which are a little flared out and may be of any convenient shape, and the inner portions of the air-passages B C are divided by a vertical partition H, introduced with a view of guiding the air in a better manner. An outer shell J is placed over the external parts. A single slide or valve G is fitted inside the door and closes or opens the inner ends E F of the air-passages equally, it being found that the apparatus acts quite well with the two passages equally opened.

In the modification shown in Figs. 8, 9, 10, and 11 the inductive passage is formed by an outer shell K, within which the outer parts of the shells of the air-passages B C are placed, and which is of such a size as to inclose a passage-space wholly or to a large extent surrounding the inner shells. The outer shell K is intended to receive a strong current of air and to direct it so as in issuing at the rear end to act on the air going out through what is at the time the rear air-passage B or C. The inner parts E F may be inclined upward where they pass through the door, as shown in Figs. 4 and 7, or they may pass horizontally through the door, as shown in Figs. 10 and 11, and an upwardly-inclined direction may be given to the entering air by inclined slats L, or a more directly upward direction may be given to the entering air by means of an internal casing M, having a valve or valves G at the top of it.

Having now particularly described and ascertained the nature of my said invention and in what manner the same is to be performed, I declare that what I claim is—

1. An apparatus for forcing air into and drawing it from cars, consisting of two separate similar air tubes or flues at their inner small ends separately opening into the interior of the car and having their large mouths at the exterior of the car facing in opposite directions, and an open induction-passage on the exterior of the car, having its opposite ends near and concentric with the mouths of said tubes, so that while the air is passing into the car through one tube the induction-passage will draw air from the car through the other tube.

2. An apparatus for the purpose set forth, consisting, essentially, of two separate similar flues or tubes having their large open mouths horizontally arranged in the same plane on the exterior of the vehicle and facing in opposite directions, with their inner small ends passing laterally through into the vehicle and separately opening into the interior thereof, and the open induction-passage similar at both open ends and extending from one mouth to the other, so that when the air is entering the vehicle through one mouth it is being drawn through the other flue by the induction-tube.

3. In a device for the purpose mentioned, the combination, with the two air-passages B C, secured to the upper part of a carriage-door and having external mouths arranged to face in opposite directions, and upwardly-inclined inner ends E F, that communicate at the same time with the interior of the carriage, of an inductive tube arranged to extend from near the outer end of one air passage to near the outer end of the other air-passage.

4. In a device for the purpose mentioned, the combination, with the two separate similar air-passages B C, secured to the upper part of a carriage-door and having the oppositely-facing flaring mouths and inner ends E F, both separately opening into the carriage, of an open inductive tube D, extending longitudinally through the outer portions of said passages and the shells forming the same, with its open ends bearing the relation to said mouths, as set forth.

5. The combination of the air-passages B C, formed by shells on the exterior of a carriage-door, having the oppositely-facing open ends and the inner ends E F, extending at right angles into the carriage, valves G on the inner ends of said ends E F, and the inductive tube D, extending through the shells forming said passages B C, substantially as described.

6. In combination, separate tubes B C, having lateral contracted discharge ends E F, and the open inductive tube D, extending through both tubes B C, substantially as described.

In testimony whereof I have signed my name to this specification in the presence of two subscribing witnesses.

JOHN ANDERSON.

Witnesses:
JAMES B. ANDERSON,
  56 *George St., Oban.*
MALCOLM MACGOLFOR,
  3 *Cawdor Place, Oban.*